United States Patent [19]

Aubel et al.

[11] Patent Number: 4,529,346

[45] Date of Patent: Jul. 16, 1985

[54] SECURING ASSEMBLY FOR A THREADED MEMBER

[75] Inventors: John A. Aubel; Patrick A. Jenkins; Thomas S. Ruffner, all of Decatur, Ill.

[73] Assignee: Borg-Warner Corporation, Chicago, Ill.

[21] Appl. No.: 516,084

[22] Filed: Jul. 22, 1983

[51] Int. Cl.³ ............................................. F16B 39/36
[52] U.S. Cl. .................................. 411/117; 411/120; 411/198; 411/204; 411/533
[58] Field of Search ............... 411/106, 108, 114, 115, 411/117, 119, 131, 134, 135, 141, 143, 144, 166, 191, 192, 195, 196, 197, 198, 326, 330, 908, 116, 120, 123, 124, 127, 204

[56] References Cited

U.S. PATENT DOCUMENTS

| 712,905 | 11/1902 | Cannon | 411/330 |
|---|---|---|---|
| 906,476 | 12/1908 | Ullmann | 411/197 |
| 1,317,058 | 9/1919 | Wiley | 411/191 |
| 1,934,439 | 11/1933 | Messmer | 411/198 |
| 3,231,300 | 1/1966 | Moroney | 287/93 |
| 3,434,746 | 3/1969 | Watts | 285/162 |
| 3,461,937 | 8/1969 | Finney . | |
| 3,464,474 | 9/1969 | Jansen . | |
| 3,486,544 | 12/1969 | Lozano et al. . | |
| 3,508,593 | 4/1970 | Gill | 411/908 |
| 4,090,545 | 5/1978 | Ritter, Jr. . | |
| 4,363,087 | 12/1982 | Graham et al. | 362/382 |

FOREIGN PATENT DOCUMENTS 553123  6/1932  Fed. Rep. of Germany ...... 411/191

Primary Examiner—Thomas J. Holko
Assistant Examiner—Neill Wilson
Attorney, Agent, or Firm—Florian S. Gregorczyk

[57] ABSTRACT

A locking and securing means is disclosed which includes a base member, a threaded member and a sprocket. The base member defines vertically extending fingers with gaps therebetween and a threaded bore. The threaded member with a flat or irregular shape on its upper leg segment extends through this bore to a desired position. The sprocket, which is mounted on the threaded member prior to insertion into the bore, has radially extending teeth to mesh with the base-member-defined gaps and an internal shape to mate with the threaded-member shape. The threaded member is thus secured to a fixed height or position.

8 Claims, 7 Drawing Figures

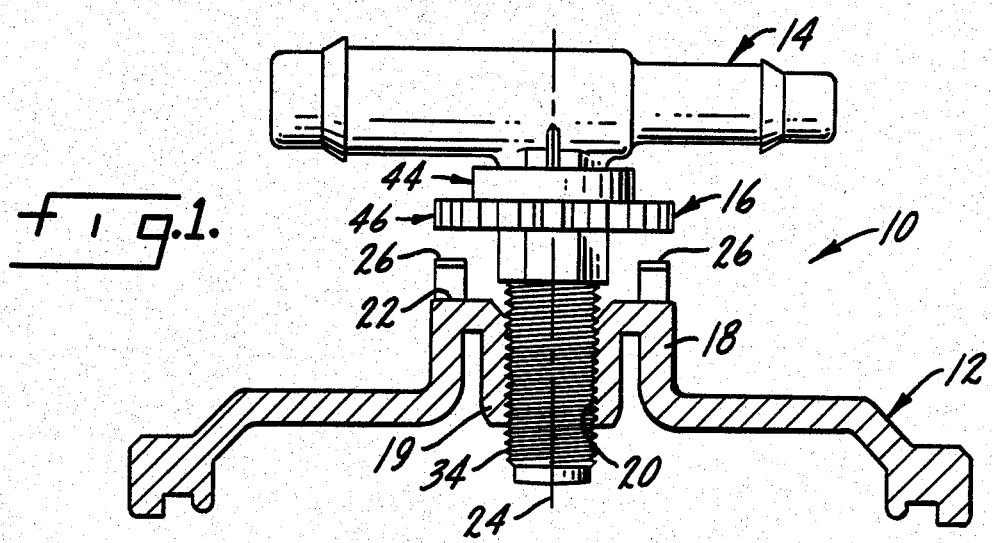
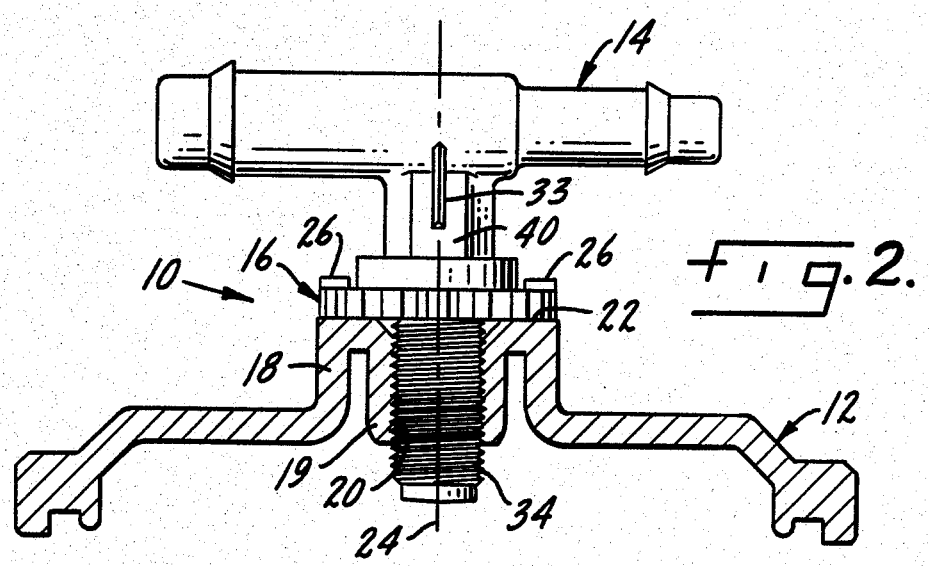
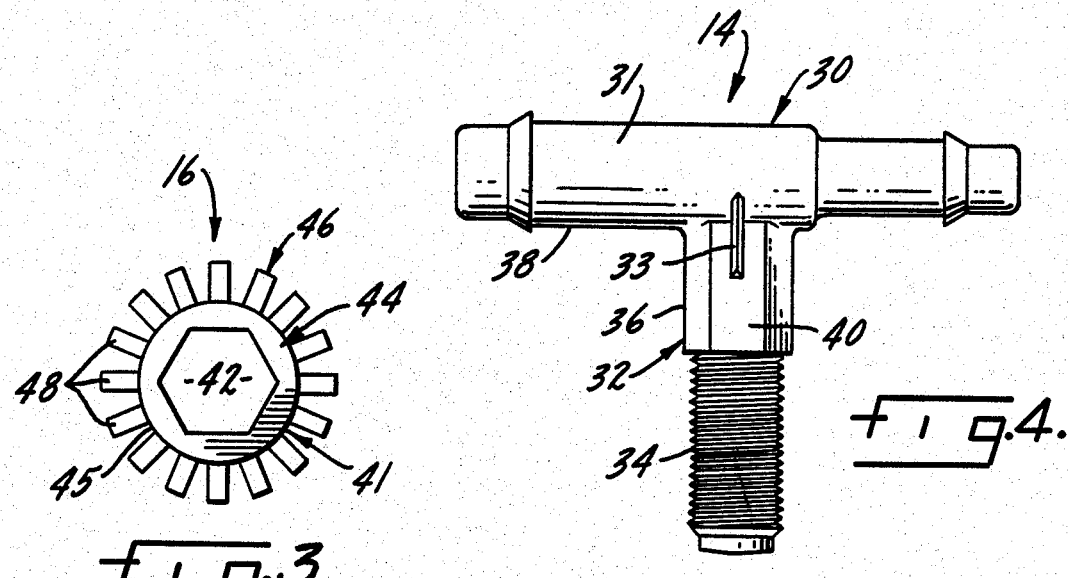

SECURING ASSEMBLY FOR A THREADED MEMBER

BACKGROUND OF THE INVENTION

1. Field of the Invention

The present invention discloses a securing or locking assembly for retaining a threaded member in a desired position after assembly.

2. Prior Art

Locking and securing means are known in the prior art. The securing or locking means include clamping, crimping of threaded members, nut and bolt assemblies, cut out portions, serrations, and lock washers. In this field nut-and-threaded-member assemblies, with or without lock washers, are frequently used as locking devices.

An example of the prior art utilized to secure an interlocking member is illustrated in U.S. Pat. No. 3,231,300 (Moroney). A crimping member with a projecting collar is utilized to receive an extending member, generally a tube or rod-like structure, through a bore in the collared member. This assembly is then forced into a passage and retained therein. However, the rod-like member mates to a receiving passage at a 90° angle therefrom and the angled portion serves as a stop. Thus, the height is not truly adjustable.

U.S. Pat. No. 3,434,746 (Watts) teaches a multi-member securing means for a flexible tube coupling. As illustrated in FIG. 9 therein, tube 8 is inserted into two wedge-shaped members having flat surfaces 15 engaging each other to form a cylindrically shaped member with an outer tapered edge. The tubing 8 is inserted through tapered members 14 which are then inserted into a third member having a c-shape. The tapered members 14 are forcefully driven into the opening in the third member to wedge or secure the tapered members against the tubing and thus secure tubing height. Such forceful means of securing the height of a member does not lend itself to ease of manufacture, nor ease of adjustment prior to assembly.

U.S. Pat. No. 3,461,937 (Finney) discloses latching retention of a removable nut utilizing a basket-type assembly. A nut having extending rotation-restraining dogs 24 is positioned within a basket 'A' having notches 14 wherein dogs 24 may fit to secure nut 'B' from rotation. Nut 'B' may be removed by pinching restraining dogs 24 and turning nut 'B' thereafter. Basket 'A' with notches 14 is secured to a base member to prevent rotation thereof. There is no teaching of securing the member which fits within nut 'B'.

U.S. Pat. No. 3,464,474 (Jansen) teaches a multi-part assembly having a fastener with a spring biased lock. In this assembly a bolt is taught with channels in its threaded member which projects through a nut having a collar with a key way cut in the collar. A locking ring 16 with a key 42 is positioned on the collar of the nut with the key 42 inserted through the key way 36 and into the channel 26 of the bolt. After assembly a spring is positioned to displace the locking ring and secure it and the nut against rotation on bolt 13. A retainer 20 is thereafter placed over this entire assembly. Again the objective is to retain the nut on the threaded member of the bolt. No means is provided to restrain the bolt, the threaded member, from turning.

U.S. Pat. No. 3,486,544 (Lozano et al.) teaches a lock washer with a radial projection which expands into an internal retaining means in the end of a nut. The radial tangs on the washer interlock with radial abutments on the nut to lock the nut and washer together against relative rotation. This interlock of the washer and nut tangs prevent rotation to hold the nut against unthreading from the male member. This patent recognizes the use of lock washers with external tangs snapping over the periphery of a nut as a known device for retaining precision bearings in place.

U.S. Pat. No. 4,090,545 (Ritter, Jr.) teaches a locking key secured to a nut, which key fits in or is secured to slots in a threaded member extending through the nut. Therefore, the key fits into a nut on a threaded member and is secured through apertures to the shell or structure of the nut.

U.S. Pat. No. 4,363,087 (Graham et al.) discloses a mounting post for an electrical switch. This mounting post is provided with cut out sections and after insertion into a wall the cut out sections are then securely locked in place between an upper and lower surface of a locking ring.

The objectives of most of the above methods are an attempt to secure a threaded member or its mating member from rotation or movement, including the utilization of a key way and key or a lock washer arrangement.

SUMMARY OF THE INVENTION

A securing means for retaining a threaded member which includes a base member defining a shoulder and a bore with a longitudinal axis to receive the threaded element member with a collar or toothed sprocket mounted thereon. The threaded member includes a portion having at least one flat surface or an irregular shape matable with the toothed sprocket, which sprocket is provided with a bore having a mating shape. Extending from the toothed sprocket are radial fingers or projecting teeth. The shoulder of the base member has projecting teeth extending vertically or parallel to the bore axis and which teeth define gaps therebetween. After the threaded member is positioned in the base member bore the toothed sprocket is moved to provide engagement of its radially extending teeth into the gaps defined by the teeth of the base member. Thus, the toothed sprocket is fixed in position against rotation and the threaded extending member is prohibited from rotation by contact with the flat or irregular shape of the toothed sprocket bore.

BRIEF DESCRIPTION OF THE DRAWINGS

In the figures of the drawings like reference numerals identify like components and in the drawings:

FIG. 1 is a diagrammatic cross-section of an assembly wherein the toothed sprocket is disengaged from the collar of the base member fingers;

FIG. 2 is a diagrammatic cross-section as in FIG. 1 wherein the toothed sprocket has engaged the base member fingers and secured the threaded member;

FIG. 3 illustrates a top plan view of the threaded sprocket;

FIG. 4 is a side view of a threaded member illustrated of FIG. 1;

DETAILED DESCRIPTION OF THE INVENTION

Figure 5:
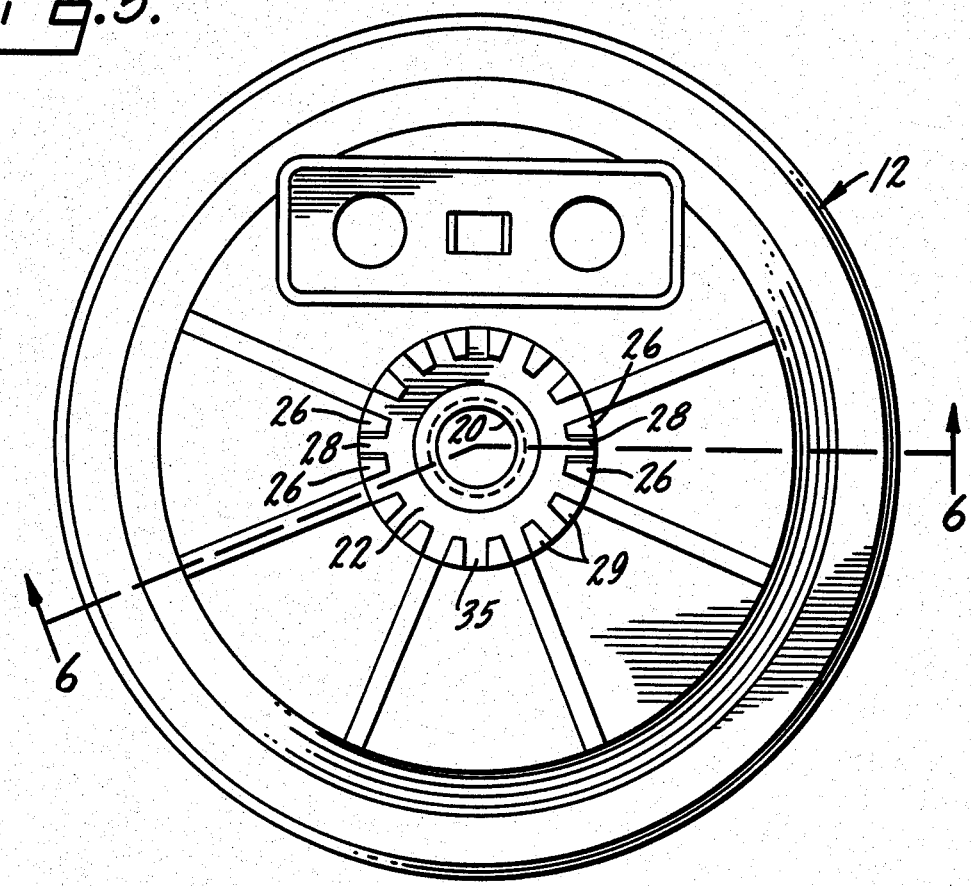
FIG. 5 is a top plan view of the base member of FIG. 1 taken on line 6—6.
Figure 6:
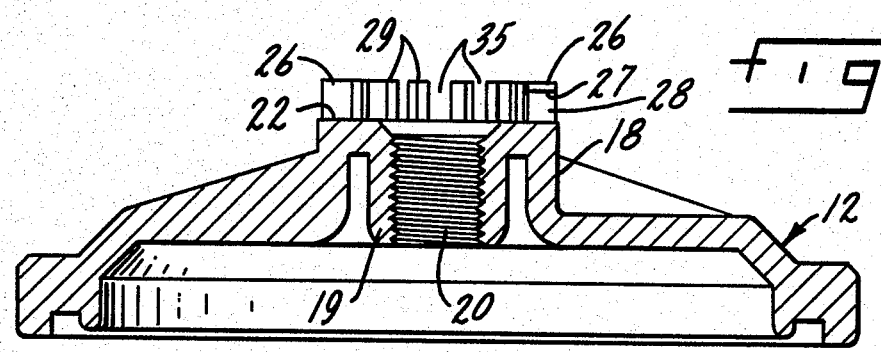
FIG. 6 is a cross-section of the base member of FIG. 1.
Figure 7:
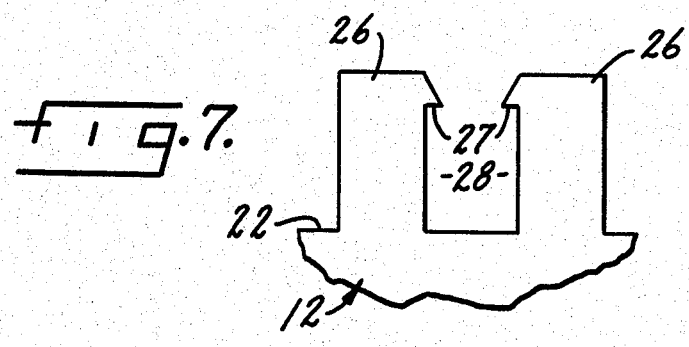
FIG. 7 is an enlarged detail of the projecting fingers of the base member and indicates the gap therebetween.

The relationship of the parts of the assembly of the securing and locking means disclosed herein is illustrated in the disengaged or unlocked position in FIG. 1. In FIG. 1 the securing means or assembly 10 is illustrated with a base member 12, a threaded or extending member 14 and a toothed sprocket 16. Base member 12 includes a collar 18 with a sidewall 19 defining a threaded passage and through-bore 20 and a shoulder or upper surface 22. Threaded bore 20 includes a longitudinal axis 24. Extending from shoulder segment 22 and parallel to axis 24 are four appendages or fingers 26 with a hook, barb or interference member 27 which are illustrated at FIGS. 5, 6 and 7. These paired appendages 26 define gaps 28 therebetween, which gaps 28 are diametrically opposed as shown in FIG. 5. Also, shown in FIGS. 5 to 7 are similar extending finger-like projections or appendages 29 without hooks 27 which define gaps 35 therebetween of a width similar to gaps 28.

As shown in FIGS. 1, 2 and 4 threaded member 14 is generally T-shaped, although such shape is utilized as an example not as a limitation. In FIG. 4 threaded member 14 includes a body 30 of a fixed length with an external wall 31. Body 30 defines a leg segment 32 having lower threaded portion 34 and upper portion 36 with cross-member 38 affixed thereto. Upper portion 36 is shown as defining at least one flat 40 along its length and may have any geometrical shape, or irregular shape, such as an ellipse and including a hexagonal shape as shown in FIG. 3, for an internal bore 42 defined by toothed sprocket 16. Threaded member 14, as noted earlier, may have any shape known in the art. In the illustrated embodiment member 14 defines a through bore having a perpendicular connecting means through leg member 32, but threaded member 14 is not limited to the illustrated shape. Threaded member 14 further defines an obstructing means or rib 33 along upper portion 36 to provide an interference fit for toothed sprocket 16 prior to assembly.

Toothed sprocket 16 defines a two segment body 41, that is, an upper segment 44 and a lower segment 46 both of which have shallow cylindrical or annular shapes, as shown in FIGS. 1 to 3. Sprocket 16 further defines a passage or bore 42 shown as a hexagonal shape in FIG. 3. Passage 42 is matable with extending member 32 of threaded member 14. Lower segment 46 with a generally annular shape defines a wall 45 and radial fingers or teeth 48 extending radially outward from lower segment 46. These radial fingers 48 are of a size that will fit or mate within gaps 28 and 35 defined between teeth or appendages 26 and 29 of base member 12. At least two of appendages 26 may define an interference portion or hook 27, as shown in FIG. 7 at the open portion of gap 28, which serves to retain or maintain toothed sprocket 16 in meshed position with base member 12. In a preferred embodiment two sets of such hooked appendages 26 would be positioned at diametrically opposed positions about shoulder 22. All of the gaps between such vertically extending teeth may be provided with these interference portions.

The assembly is shown in FIGS. 1 and 2 in the unlocked and locked positions, respectively. Toothed sprocket 16 is mounted about upper portion 36 of leg member 32 and retained there by the interference fit between rib 33 and internal bore 42 prior to assembly. Threaded portion 34 of threaded member 14 is threaded or screwed in bore 20 of base member 12. Threaded member 14 may be fixed or located in position from any point such as shoulder segment 22. Thereafter, toothed sprocket 16 is disengaged from its interference fit and moved vertically downward, as shown in FIGS. 1 and 2, to permit engagement of radially extending teeth 48 to seat or engage gaps 28 and 35 between appendages 26 and 29. Flat 40 or irregular shape of threaded member 14 continues to be in engagement with the mating surface of bore 42. This flat or mating engagement prevents rotation of threaded member 14 after radial teeth 48 mesh with gaps 28 and 35, and thereby fixes the position or height of threaded member 14 in base member 12.

The above structure and assembly means for any component such as threaded member 14 in a base member, which may or may not be an independent member from a mounting body, provides a means to secure such component with ease of assembly as well as requiring minimal machining or mechanical work of the components. Such parts if made from plastic materials, as known in the art, may be injection molded for high production rates with minimal labor input thereto.

While only a specific embodiment of the invention has been described and shown, it is apparent that various alternatives and modifications can be made thereto. Those skilled in the art will recognize that certain variations can be made in this illustrative embodiment. It is, therefore, the intention in the appended claims to cover all such modifications and alternatives as may fall within the true scope of the invention.

We claim:
1. A securing means, comprising:
    a base member having a body and a collar affixed to said body,
    said collar defining a sidewall and a through-bore with threads therein along a longitudinal axis,
    said collar having an upper surface with projecting appendages extending therefrom and generally parallel with said longitudinal axis, which projecting appendages define gaps therebetween about said upper surface of said collar;
    an extending member having a generally cylindrical body defining a leg segment with an external wall of a fixed length, and having a lower threaded portion and an upper portion along its length and further defining at least one flat along the upper portion of said fixed length of said external wall which extends to said threaded portion; and
    a toothed sprocket defining a two-segment body with an upper segment and a lower segment, said sprocket defining a passage through said segments, said sprocket defining an internal wall matable with said extending member flat and said lower segment defining radial teeth extending from said lower segment, said sprocket being slidable along said extending member such that said radial teeth are matable with said projecting teeth gaps to prevent rotation of said sprocket and in cooperation with the mated internal wall of said sprocket passage and said extending member flat secures the position of said extending member.
2. A securing means, comprising:
    a base member having a body and a collar affixed to said body,
    said collar defining a sidewall and a through-bore with threads therein along a longitudinal axis, said collar having an upper surface with projecting appendages extending therefrom and generally parallel with said longitudinal axis, which projecting appendages define gaps therebetween about said upper surface of said collar;

an extending member having a generally cylindrical body defining a leg segment with an external wall of a fixed length, and having a lower threaded portion and an upper portion along its length and further defining at least one flat along the upper portion of said fixed length of said external wall which extends to said threaded portion; and a toothed sprocket defining a two-segment body with an upper segment and a lower segment, a rib extending along said extending member upper portion to provide an interference fit between said extending member and said toothed sprocket, said sprocket defining a passage through said segments, said sprocket further defining an internal wall matable with said extending member flat and said lower segment defining radial teeth extending from said lower segment, said sprocket being slidable along said extending member such that said radial teeth are matable with said projecting teeth gaps to prevent rotation of said sprocket and in cooperation with the mated internal wall of said sprocket passage and said extending member flat secures the position of said extending member.

3. A securing means, comprising:

a base member having a body and a collar affixed to said body, said collar defining a sidewall and a through-bore with threads therein along a longitudinal axis, said collar having an upper surface with projecting appendages extending therefrom and generally parallel with said longitudinal axis, which projecting appendages define gaps therebetween about said upper surface of said collar;

an extending member having a generally cylindrical body defining a leg segment with an external wall of a fixed length, and having a lower threaded portion and an upper portion along its length and further defining an irregular shape along the upper portion of said fixed length of said external wall which extends to said threaded portion; and a toothed sprocket defining a two-segment body with an upper segment and a lower segment, a rib extending along said extending member upper portion to provide an interference fit between said extending member and said toothed sprocket, said sprocket defining a passage through said segments, said sprocket further defining an internal wall matable with said extending member shape and said lower segment defining radial teeth extending from said lower segment, said sprocket being slidable along said extending member such that said radial teeth are matable with said projecting teeth gaps to prevent rotation of said sprocket and, in cooperation with the mated internal wall of said sprocket passage and said extending member shape, secures against rotation the position of said extending member.

4. A securing means as claimed in claim 2 wherein said base member, extending member and toothed sprocket are plastic.

5. A securing means as claimed in claim 2 wherein said projecting appendages define an interference member to retain said toothed sprocket in meshed contact between said projecting appendages.

6. A securing means as claimed in claim 3 wherein said base member, extending member and toothed sprocket are plastic.

7. A securing means as claimed in claim 3 wherein said projecting appendages define an interference member to retain said toothed sprocket in meshed contact between said projecting appendages.

8. A securing means, comprising:

a base member having a body and a collar affixed to said body, said collar defining a sidewall and a through-bore with threads therein along a longitudinal axis, said collar having an upper surface with projecting appendages extending therefrom and generally parallel with said longitudinal axis, which projecting appendages define gaps therebetween about said upper surface of said collar;

an extending member having a generally cylindrical body defining a leg segment with an external wall of a fixed length, and having a lower threaded portion and an upper portion along its length and further defining an irregular shape along the upper portion of said fixed length of said external wall which extends to said threaded portion; and a toothed sprocket defining a two-segment body with an upper segment and a lower segment, said sprocket defining a passage through said segments, said sprocket defining an internal wall matable with said extending member shape and said lower segment defining radial teeth extending from said lower segment, said sprocket being slidable along said extending member such that said radial teeth are matable with said projecting teeth gaps to prevent rotation of said sprocket and, in cooperation with the mated internal wall of said sprocket passage and said extending member shape, secures against rotation the position of said extending member.

* * * * *